United States Patent
Vergis et al.

(10) Patent No.: US 12,332,812 B2
(45) Date of Patent: Jun. 17, 2025

(54) MEMORY DEVICE MANAGEABILITY BUS

(71) Applicant: Intel Corporation, Santa Clara, CA (US)

(72) Inventors: George Vergis, Portland, OR (US); John R. Goles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 17/470,278

(22) Filed: Sep. 9, 2021

(65) Prior Publication Data

US 2021/0406206 A1   Dec. 30, 2021

(51) Int. Cl.
*G06F 13/16* (2006.01)

(52) U.S. Cl.
CPC ................. *G06F 13/1668* (2013.01)

(58) Field of Classification Search
CPC ...................................................... G01R 1/071
See application file for complete search history.

(56) References Cited

U.S. PATENT DOCUMENTS

| | | | | |
|---|---|---|---|---|
| 7,533,204 B2 * | 5/2009 | Zimmerman | ....... | G06F 12/0676 711/170 |
| 2019/0042498 A1 * | 2/2019 | Morris | ................ | G06F 13/1684 |

* cited by examiner

*Primary Examiner* — Henry Tsai
*Assistant Examiner* — Juanito C Borromeo
(74) *Attorney, Agent, or Firm* — Essential Patents Group, LLP

(57) ABSTRACT

An embodiment of an electronic apparatus may comprise one or more substrates, and a controller coupled to the one or more substrates, the controller including circuitry to enumerate respective sideband addresses to ten or more memory devices, and provide bi-directional communication with an individual memory device of the ten or more memory devices with a particular sideband address enumerated to the individual memory device. Other embodiments are disclosed and claimed.

15 Claims, 11 Drawing Sheets

58

|  | | Column | | | | |
|---|---|---|---|---|---|---|
|  | | 000 | 001 | 010 | 011 | 100 |
| | 0000 | DRAM | DRAM | DRAM | DRAM | DRAM |
| CH A | 0001 | DRAM | DRAM | DRAM | DRAM | DRAM |
| Row | 0010 | DRAM | DRAM | DRAM | DRAM | DRAM |
| | 0011 | DRAM | DRAM | DRAM | DRAM | DRAM |
| | 0100 | Data Buffer | Data Buffer | Data Buffer | Data Buffer | Data Buffer |

RCD 59

|  | | | | | | |
|---|---|---|---|---|---|---|
| | 0000 | DRAM | DRAM | DRAM | DRAM | DRAM |
| CH B | 0001 | DRAM | DRAM | DRAM | DRAM | DRAM |
| Row | 0010 | DRAM | DRAM | DRAM | DRAM | DRAM |
| | 0011 | DRAM | DRAM | DRAM | DRAM | DRAM |
| | 0100 | Data Buffer | Data Buffer | Data Buffer | Data Buffer | Data Buffer |
| | | 000 | 001 | 010 | 011 | 100 |
| | | | | Column | | |

Enumeration Matrix

FIG. 5

| Bit 7 | Bit 6 | Bit 5 | Bit 4 | Bit 3 | Bit 2 | Bit 1 | Bit 0 |
|---|---|---|---|---|---|---|---|
| ROW[3] | ROW[2] | ROW[1] | ROW[0] | COL[2] | COL[1] | COL[0] | R/W |
| Row ID (ROW) | | | | Column ID (COL) | | | Read/Write |

FIG. 6A

| Row Address | |
|---|---|
| RCD QCS Signal | 4-bit ROW ID |
| QASC0_A_n | SPD Fields |
| QASC0_B_n | |
| QBSC0_A_n | SPD Fields |
| QBSC0_B_n | |
| QASC1_A_n | SPD Fields |
| QASC1_B_n | |
| QBSC1_A_n | SPD Fields |
| QBSC1_B_n | |

FIG. 6B

| Column Address | | |
|---|---|---|
| DRAM Strap Pin | 3-bit COL ID | Comment |
| 10.0 KΩ to VSS | COL = 000 | 1% Resistor |
| 15.4 KΩ to VSS | COL = 001 | |
| 23.2 KΩ to VSS | COL = 010 | |
| 35.7 KΩ to VSS | COL = 011 | |
| 54.9 KΩ to VSS | COL = 100 | |

FIG. 6C

| Bit 7 | Bit 6 | Bit 5 | Bit 4 | Bit 3 | Bit 2 | Bit 1 | Bit 0 |
|---|---|---|---|---|---|---|---|
| ROW[3] | ROW[2] | ROW[1] | ROW[0] | HID[2] | HID[1] | HID[0] | R/W |
| Row ID (ROW) | | | | Host ID (HID) | | | Read/Write |

FIG. 7A

| Row Address | |
|---|---|
| RCD BCS Signal | 4-bit ROW ID |
| BCS_A_n | SPD Fields |
| BCS_B_n | |

FIG. 7B

| Column Address | | |
|---|---|---|
| DRAM Strap Pin | 3-bit HID | Comment |
| 10.0 KΩ to VSS | HID = 000 | 1% Resistor |
| 15.4 KΩ to VSS | HID = 001 | |
| 23.2 KΩ to VSS | HID = 010 | |
| 35.7 KΩ to VSS | HID = 011 | |
| 54.9 KΩ to VSS | HID = 100 | |

FIG. 7C

MEMORY DEVICE MANAGEABILITY BUS

BACKGROUND

An electronic system may include a primary communication interface between devices in the system, which in some systems may be referred to as an "in-band" bus. The system may also include another communication interface between devices outside of the primary communication interface, which in some systems may be referred to as a "sideband" bus. The in-band bus generally supports much higher bandwidth as compared to the sideband bus. Example interfaces that are sometimes utilized for such sideband communication include the interfaces defined by the Mobile Industry Processor Interface (MIPI) I2C and I3C specifications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a block diagram of an example of a computing system according to an embodiment;

FIGS. 6A to 6C are illustrative diagrams of an example of a communication protocol format according to an embodiment;

FIGS. 7A to 7C are illustrative diagrams of another example of a communication protocol format according to an embodiment;

DETAILED DESCRIPTION

Figure 1:
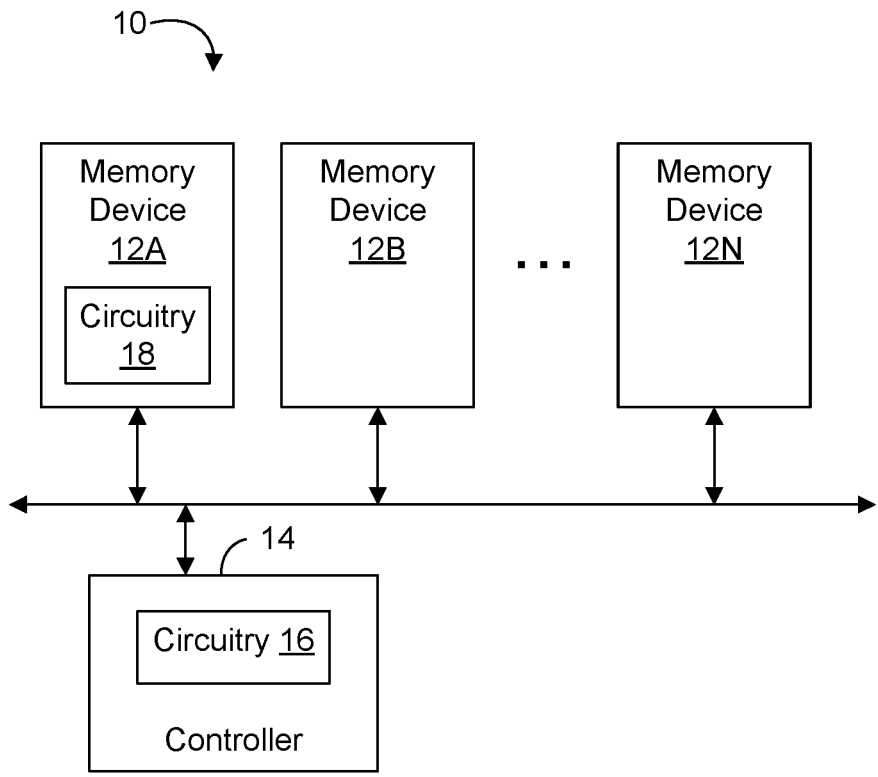
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

With reference to FIG. 1, an embodiment of an electronic system 10 may include ten or more memory devices 12A through 12N (collectively "memory devices 12"), and a controller 14 communicatively coupled to the ten or more memory devices 12. The controller 14 may include first circuitry 16 to enumerate respective sideband addresses to ten or more memory devices 12, and provide bi-directional communication with an individual memory device 12A of the ten or more memory devices 12 with a particular sideband address enumerated to the individual memory device 12A. In some embodiments, the first circuitry 16 may be further configured to select a sub-group of the ten or more memory devices 12 for sideband address enumeration, and send an enumeration command to the selected group (e.g., the enumeration command may be broadcasted to the entire group and only the sub-group with a chip select asserted will act on the enumeration command, while all other devices will ignore the command).

For example, the first circuitry 16 may be configured to assert respective chip select signals for each memory device of the ten or more memory devices 12 that is in the selected sub-group, and de-assert respective chip select signals for each memory device of the ten or more memory devices 12 that is not in the selected sub-group. In some embodiments, the first circuitry 16 may be further configured to program a first portion of sideband addresses in each memory device of the ten or more memory devices 12 that is in the selected sub-group. For example, the first circuitry 16 may be configured to broadcast a value of the first portion of the sideband addresses to be programmed in the selected sub-group (e.g., where the value is only processed by the sub-group of memory devices 12 that have the chip select signals asserted).

In some embodiments, the individual memory device 12A (e.g., and individual memory devices 12B through 12N) includes second circuitry 18 to program a first portion of a sideband address for the individual memory device 12A in response to an enumeration command from the controller 14, and set a second portion of the sideband address for the individual memory device 12A in accordance with a voltage value on a strap pin of the individual memory device 12A. For example, the second circuitry 18 may be configured to inject current into the strap pin in response to the enumeration command to develop the voltage value in accordance with a resistance value on the strap pin, convert the voltage value into a digital value, and set the second portion of the sideband address for the individual memory device 12A based on the digital value. In any of the embodiments herein, at least one of the ten or more memory devices 12 may comprise an integrated circuit (IC) chip with dynamic random access memory (DRAM) or a data buffer (DB) on the same die with the IC chip.

Embodiments of each of the above memory devices 12, controller 14, first circuitry 16, second circuitry 18, and other system components may be implemented in hardware, software, or any suitable combination thereof. For example, hardware implementations may include configurable logic such as, for example, programmable logic arrays (PLAs), FPGAs, complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 14 may include a general purpose controller, a special purpose controller, a memory controller, a storage controller, a microcontroller, a general purpose processor, a special purpose processor, a central processor unit (CPU), an execution unit, etc. In some embodiments, the memory devices 12, the first circuitry 16, the second circuitry 18, and/or other system memory may be located in, or co-located with, various components, including the controller 14 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory devices 12, persistent storage media, or other system memory may store a set of instructions which when executed by the controller 14 cause the system 10 to implement one or more components, features, or aspects of the system 10 (e.g., enumerating the sideband addresses to the memory devices 12, providing bi-directional communication with an individual memory device of the memory devices 12 with a particular sideband address enumerated to the individual memory device, etc.).

Figure 2:
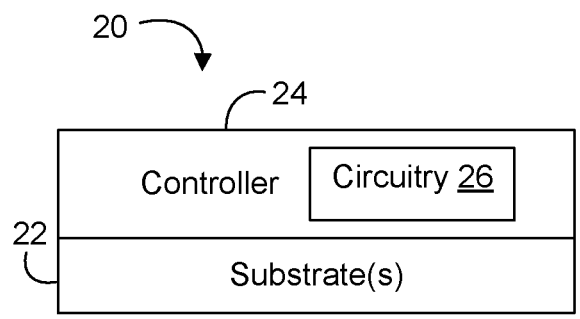
FIG. 2 is a block diagram of an example of an electronic apparatus according to an embodiment.

With reference to FIG. 2, an embodiment of an electronic apparatus 20 may include one or more substrates 22, and a controller 24 coupled to the one or more substrates 22. The controller 24 may include circuitry 26 to enumerate respective sideband addresses to ten or more memory devices, and provide bi-directional communication with an individual memory device of the ten or more memory devices with a particular sideband address enumerated to the individual memory device. In some embodiments, the circuitry 26 may be further configured to select a sub-group of the ten or more memory devices for sideband address enumeration, and send an enumeration command to the selected group. For example, the circuitry 26 may be configured to assert respective chip select signals for each memory device of the ten or more memory devices that is in the selected sub-group, and de-assert respective chip select signals for each memory device of the ten or more memory devices that is not in the selected sub-group. In some embodiments, the circuitry 26 may be further configured to program a first portion of sideband addresses in each memory device of the ten or more memory devices that is in the selected sub-group. For example, the circuitry 26 may be configured to broadcast a value of the first portion of the sideband addresses to be programmed in the selected sub-group. In any of the embodiments herein, at least one of the ten or more memory devices 12 may comprise an IC chip with DRAM or a DB on the same die with the IC chip.

Figure 3:
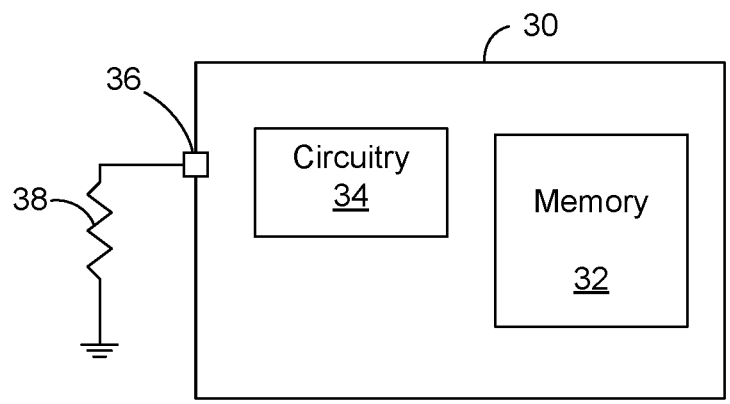
FIG. 3 is a block diagram of another example of an electronic apparatus according to an embodiment.

With reference to FIG. 3, an embodiment of an electronic apparatus 30 may include a memory 32, and circuitry 34 coupled to the memory 32. The circuitry 34 may be configured to set a sideband address for the apparatus 30 in response to an enumeration command from a controller, and provide bi-directional communication with the controller at the enumerated sideband address. In some embodiments, the circuitry 34 may be further configured to program a first portion of the sideband address for the apparatus 30 in response to the enumeration command from the controller, and set a second portion of the sideband address for the apparatus 30 in accordance with a voltage value on a strap pin 36 of the apparatus 30. For example, the circuitry 34 may be configured to inject current into the strap pin 36 in response to the enumeration command to develop the voltage value in accordance with a resistance value on the strap pin 36, convert the voltage value into a digital value, and set the second portion of the sideband address for the apparatus 30 based on the digital value. In some embodiments, a resistor 38 with a pre-determined resistance value may be coupled between the strap pin 36 and VSS to develop a desired voltage value that provides the desired second portion of the sideband address for the apparatus 30. In some embodiments, the apparatus 30 may comprise an IC chip and the memory 32 may comprise DRAM. Alternatively, or additionally, the memory 32 may comprise a DB.

Embodiments of the controller 24, circuitry 26, memory 32, and/or circuitry 34 may be implemented in a system, apparatus, computer, device, etc., for example, such as those described herein. More particularly, hardware implementations of the circuitry 26, 34 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 26, 34 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 26, 34 may be implemented on a semiconductor apparatus, which may include one or more substrates, with the circuitry 26, 34 coupled to the one or more substrates. In some embodiments, the circuitry 26, 34 may be at least partly implemented in one or more of configurable logic and fixed-functionality hardware logic on semiconductor substrate(s) (e.g., silicon, sapphire, gallium-arsenide, etc.). For example, the circuitry 26, 34 may include a transistor array and/or other integrated circuit components coupled to the substrate(s) with transistor channel regions that are positioned within the substrate(s). The interface between the circuitry 26, 34 and the substrate(s) may not be an abrupt junction. The circuitry 26, 34 may also be considered to include an epitaxial layer that is grown on an initial wafer of the substrate(s).

Figure 4A:
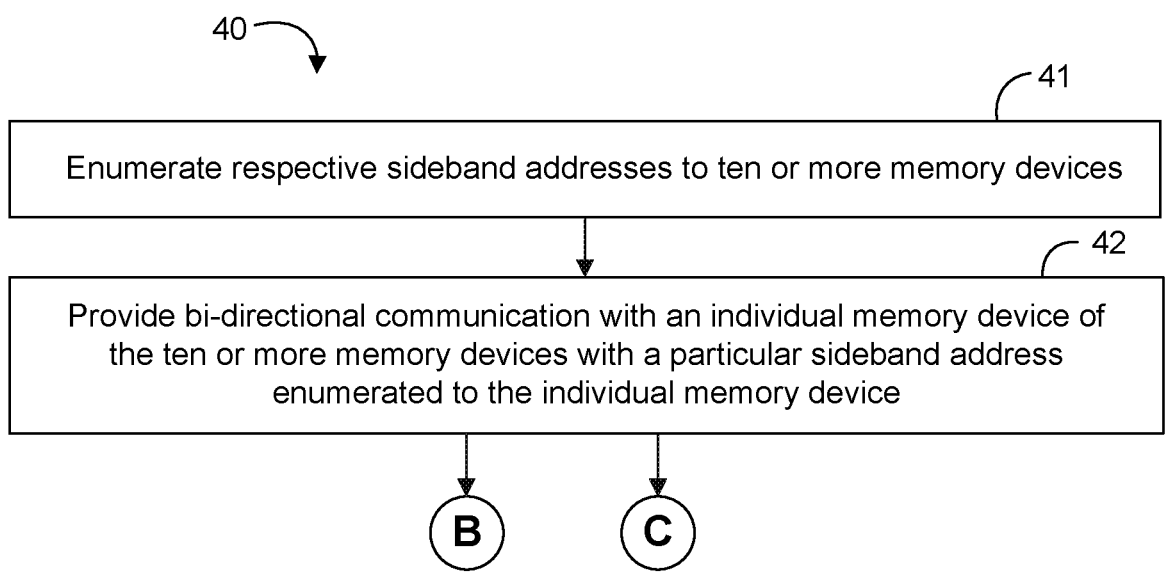
FIGS. 4A to 4C is a flowchart of an example of a method of controlling memory according to an embodiment.
Figure 4B:
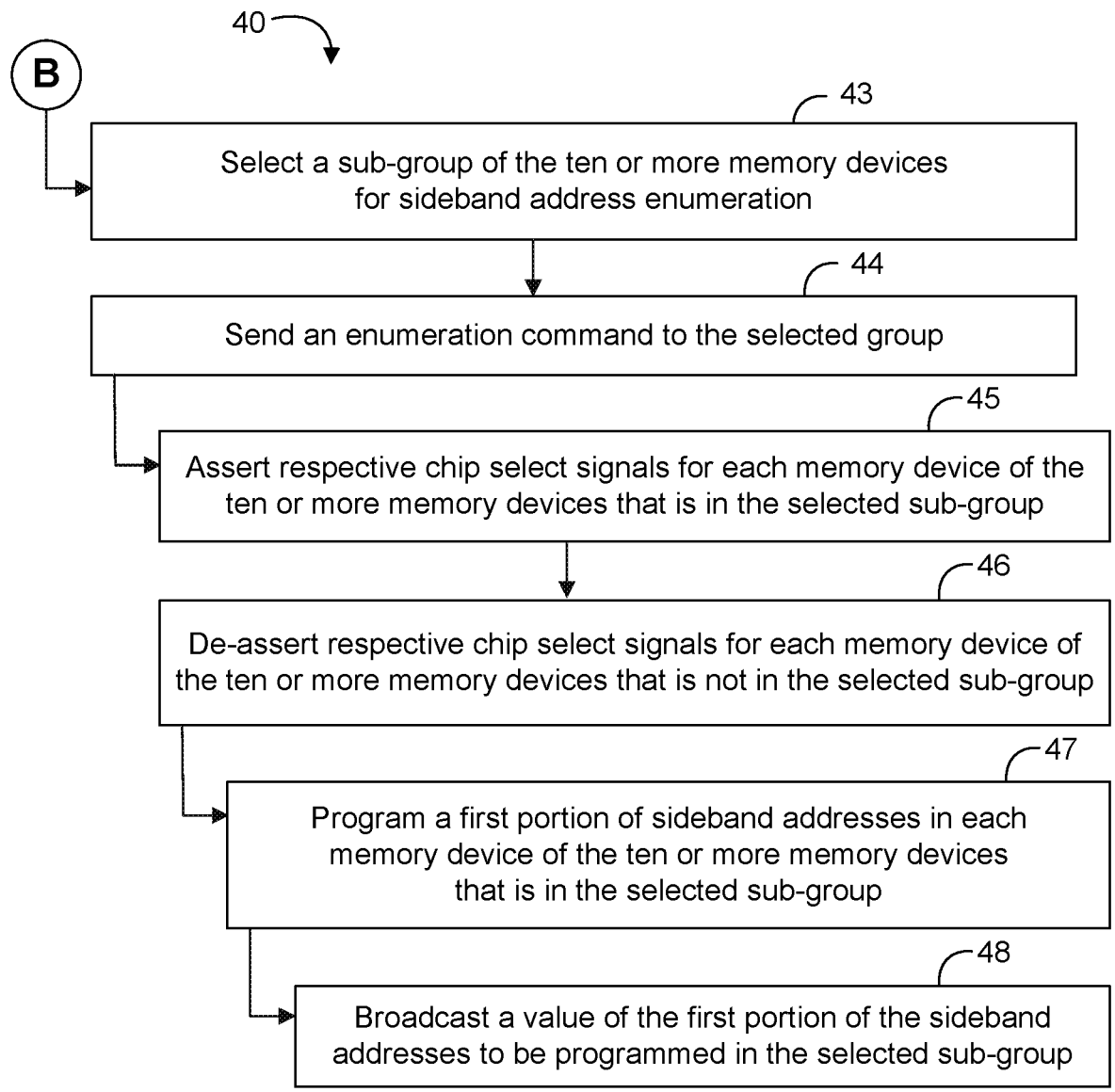
Figure 4C:
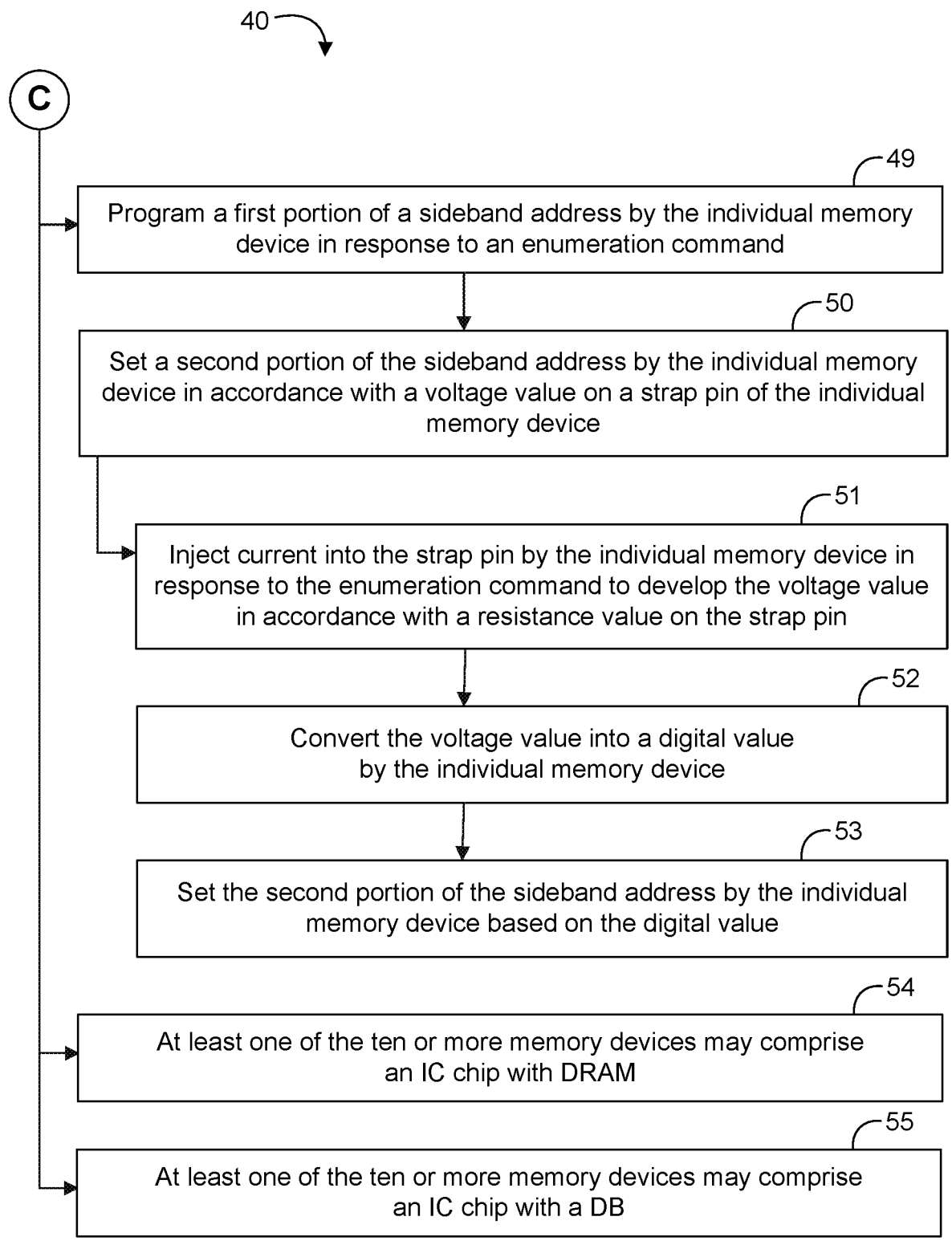

Turning now to FIGS. 4A to 4C, an embodiment of a method 40 of controlling memory may include enumerating respective sideband addresses to ten or more memory devices at block 41, and providing bi-directional communication with an individual memory device of the ten or more memory devices with a particular sideband address enumerated to the individual memory device at block 42. Some embodiments of the method 40 may further include selecting a sub-group of the ten or more memory devices for sideband address enumeration at block 43, and sending an enumeration command to the selected group at block 44 (e.g., the enumeration command may be broadcasted to the entire group and only the sub-group with a chip select asserted will act on the enumeration command, while all other devices will ignore the command).

For example, the method 40 may include asserting respective chip select signals for each memory device of the ten or more memory devices that is in the selected sub-group at block 45, and de-asserting respective chip select signals for each memory device of the ten or more memory devices that is not in the selected sub-group at block 46. The method 40 may then include programming a first portion of sideband addresses in each memory device of the ten or more memory devices that is in the selected sub-group at block 47. For example, the method 40 may include broadcasting a value of the first portion of the sideband addresses to be programmed in the selected sub-group at block 48.

In some embodiments, the method 40 may further include programming a first portion of a sideband address by the individual memory device in response to an enumeration command at block 49, and setting a second portion of the sideband address by the individual memory device in accordance with a voltage value on a strap pin of the individual memory device at block 50. For example, the method 40 may further include injecting current into the strap pin by the individual memory device in response to the enumeration command to develop the voltage value in accordance with a resistance value on the strap pin at block 51, converting the voltage value into a digital value by the individual memory device at block 52, and setting the second portion of the sideband address by the individual memory device based on the digital value at block 53. In any of the embodiments herein, at least one of the ten or more memory devices may comprise an IC chip with DRAM at block 54. Alternatively, or additionally, at least one of the ten or more memory devices comprises an IC chip with a DB at block 55.

Embodiments of the method 40 may be implemented in a system, apparatus, computer, device, etc., for example, such as those described herein. More particularly, hardware implementations of the method 40 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 40 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 40 may be implemented on a computer readable medium. Embodiments or portions of the method 40 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for a DRAM manageability bus for more than eight (8) connected memory devices. A conventional I2C/I3C domain controller can only address eight (8) devices of the same device type (e.g., Device ID). Some systems may benefit from sideband manageability of much more than eight DRAMs and/or data buffers (DBs) (e.g., more than 50 devices in some systems). To configure more than 8 devices, conventional sideband bus technology would require grouping all devices into a maximum of 8 devices per group. Each group may then be uniquely selected and assigned a device type ID during an enumeration phase.

With conventional technology, per DRAM and per DB addressability requires in-band signaling. For example, a conventional system may perform configuration of more than 8 devices with over an in-band DDR bus, and not utilize a sideband bus for such configuration. A problem is that the in-band bus needs to be setup and/or trained prior to usage. At higher speeds, the DDR interface itself requires configuration prior to further in-band configuration. Additionally, the host cannot access individual memory devices during run time without bandwidth impact. Advantageously, embodiments overcome one or more of the foregoing problems. Some embodiments provide technology to extend addressing for DRAMs and DBs on a sideband bus (e.g., with and I3C interface). In some embodiments, a unique sideband address is provided for every DRAM and DB.

With reference to FIG. 5, an embodiment of a computing system 58 includes a register clock driver (RCD) 59 and a plurality of devices (e.g., DRAM devices, DB devices, etc.) logically organized as a matrix or grid with the devices grouped in nominal rows and/or columns. In some implementations, the expanded addressing exclusively relies only on a sideband bus to individually control the chip select (CS) outputs of the RCD 59. The RCD 59 itself is located on the sideband bus. To enumerate individual DRAM device and DB device addresses on a dual-inline memory module (DIMM), for example, the devices are grouped as a grid comprised of both rows and columns. The DIMM may include the devices physically organized in a grid that follows the logical organization, but such physical organization is not necessary.

Each row is associated with a corresponding dedicated DDR CS output signal from the RCD. On the other hand, each device's column position, within the same row, is identified by a fixed unique value (e.g., referred to as the column position or column address), which may be determined by strapping resistor with a pre-determined value. Alternatively, other techniques may be employed to provide a desired voltage value to a strapping pin on each device. Alternatively, a ROM or fuse-programmable register may hold the fixed unique value.

During an enumeration phase, a 4-bit row address is programmed into the devices by selecting a group (e.g., a row of DRAMs) using the CS on the RCD. Upon receiving an enumeration command, the device injects a small amount of current into its own strap pin tied to the unique and specified resistor value to develop a unique voltage level. Each device subsequently converts and latches this voltage value into a 3-bit digital ID for the column position, and then turns off the current source.

With reference to FIGS. 6A to 6C, an example communication protocol format for a DRAM device may include seven (7) bits for the device address and one bit to indicate a read or write request. FIG. 6B shows an example of signals and fields that may be utilized to provide a 4-bit row position (e.g., ROW ID) for the DRAM device. FIG. 6C shows an example of fixed resistance values that may be coupled between the strap pin and VSS to generate a 3-bit column position (e.g., COL ID) for the DRAM device. FIG. 6A shows how the row and column positions may be mapped to a unique device address for the DRAM device.

With reference to FIGS. 7A to 7C, an example communication protocol format for a DB device may include seven (7) bits for the device address and one bit to indicate a read or write request. FIG. 7B shows an example of signals and fields that may be utilized to provide a 4-bit row position (e.g., ROW ID) for the DB device. FIG. 7C shows an example of fixed resistance values that may be coupled between the strap pin and VSS to generate a 3-bit host identifier (e.g., HID). FIG. 7A shows how the row and HIDs may be mapped to a unique device address for the DB device.

In the enumeration phase, in some embodiments, the row and column position (e.g., or HID) are established and mapped into a unique 7-bit address. For example, the 7-bit address may adhere to a standard I2C/I3C address protocol format. After the address enumeration is completed, the host sideband bus controller (e.g., an I3C host controller) can then uniquely select any device (e.g., DRAM or DB) from the "grid" to gain full access to the selected device's configuration registers. Advantageously, after enumeration the sideband bus addressing does not require the DDR CS signals or any DDR signals, such that DDR signals coming out of the RCD can be returned for DDR protocol usage. Embodiments advantageously allow bi-directional communication with the DRAMs and DBs through the sideband bus instead of the in-band memory channel. For example, embodiments may utilize the sideband bus to access individual DRAM and DB devices at initialization for setting termination values, timing values, post-package repair, etc. Embodiments may also utilize the sideband bus to access individual DRAM and DB devices at run time to read temperature values, other health/error conditions, etc. Embodiments may utilize the sideband bus to replace conventional techniques for device configuration and also to allow authentication of individual devices for security purposes.

Figure 8:
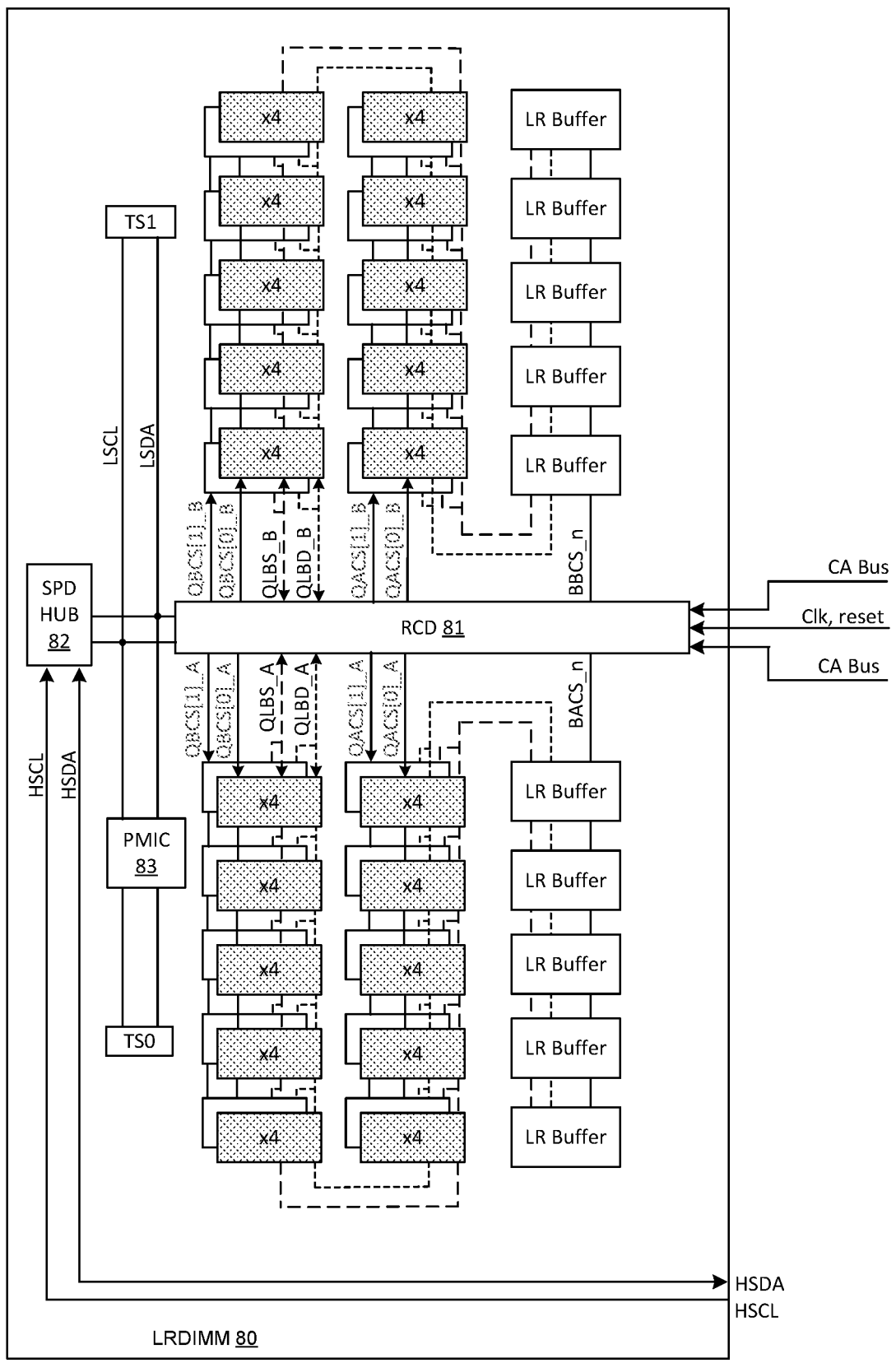
FIG. 8 is a block diagram of an example of a load-reduction DIMM (LRDIMM) according to an embodiment.

With reference to FIG. 8, an embodiment of a load-reduction DIMM (LRDIMM) 80 includes a RCD 81, a serial presence detect (SPD) hub 82, a power management IC (PMIC) 83, and two thermal sensors TS0 and TS1, coupled as shown. The LRDIMM 80 utilizes a grid or matrix to segregate front and back DRAM devices (e.g., where the front DRAMs are illustrated as shaded) and load-reduction (LR) buffers into nominal rows and columns for enumeration. Some memory devices may include two loopback pins, that embodiments of the LRDIMM 80 may dual purpose for sideband bus clock and data, without altering the loopback functionality. For example, the DRAM Rank CS signal is utilized to qualify in the row address during addressing enumeration, and similarly the Buffer CS signal for the LR buffers. The matrix row addresses are stored in the SPD hub 82 and are broadcasted on the bus to all DRAMs/buffers.

Only the DRAMs/buggers with asserted CS signals will enumerate their row address to the broadcasted value. The column addresses are enumerated by the strap pin current, which are controlled by resistor values to VSS (e.g., as shown in FIG. 3 and FIGS. 6C and 7C). After the address enumeration is completed, the host sideband bus controller has full access to all device configuration registers, and the CS signals are no longer needed to access the individual devices at their respective enumerated addresses.

Figure 9:
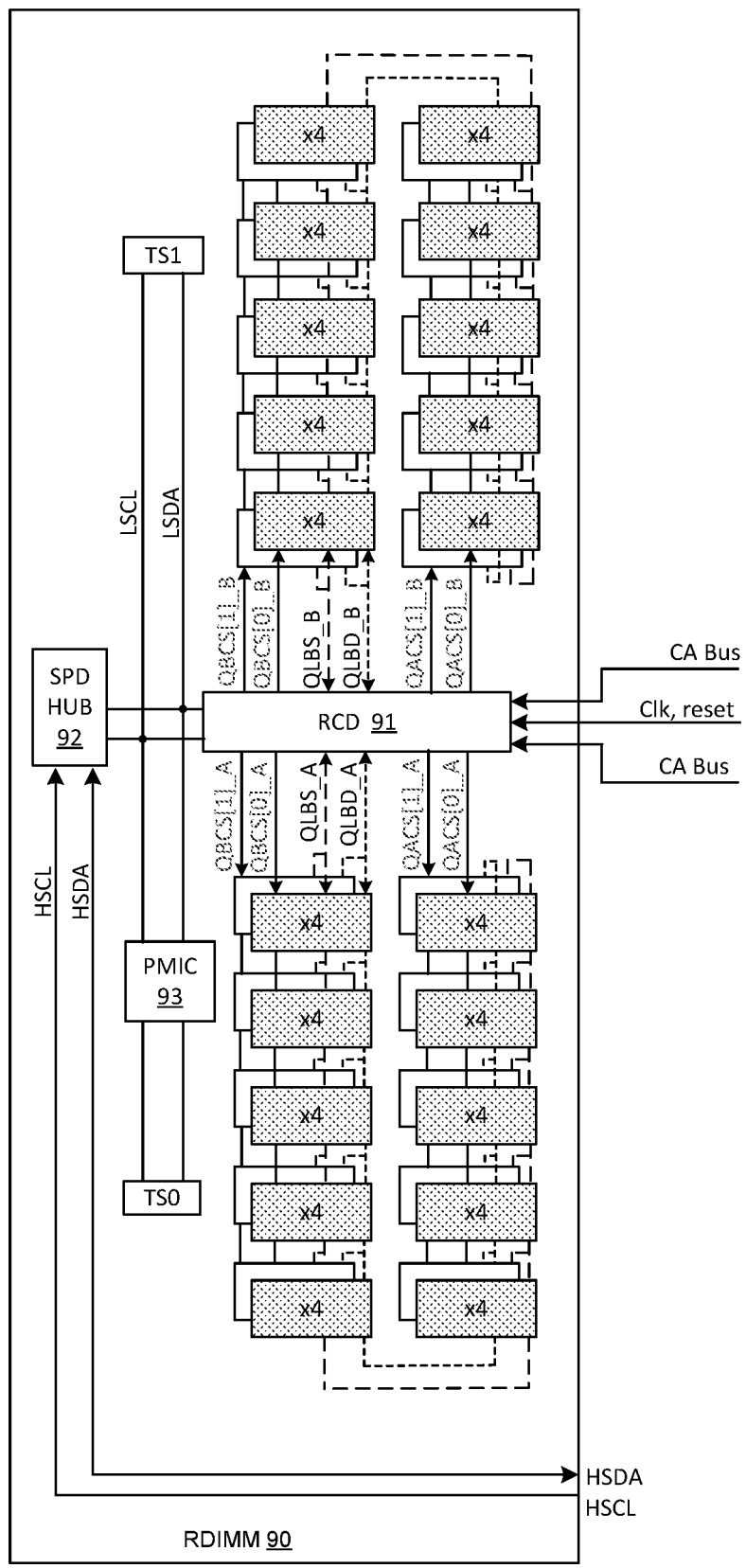
FIG. 9 is a block diagram of an example of a registered DIMM (RDIMM) according to an embodiment.

With reference to FIG. 9, an embodiment of a registered DIMM (RDIMM) 90 includes a RCD 91, a SPD hub 92, a PMIC 93, and two thermal sensors TS0 and TS1, coupled as shown. The RDIMM 90 utilizes a grid or matrix to segregate front and back DRAM devices (e.g., where the front DRAMs are illustrated as shaded) into nominal rows and columns for enumeration. The DRAM devices include two loopback pins, that embodiments of the RDIMM 90 dual purposes for sideband bus clock and data, without altering the loopback functionality. For example, the DRAM Rank CS signal is utilized to qualify in the row address during addressing enumeration. The matrix row addresses are stored in the SPD hub 92 and are broadcasted on the bus to all DRAM devices. Only the DRAM devices with asserted CS signals will enumerate their row address to the broadcasted value. The column addresses are enumerated by the strap pin current, which are controlled by resistor values to VSS (e.g., as shown in FIG. 3 and FIGS. 6C and 7C). After the address enumeration is completed, the host sideband bus controller has full access to all device configuration registers, and the CS signals are no longer needed to access the individual devices at their respective enumerated addresses.

Figure 10:
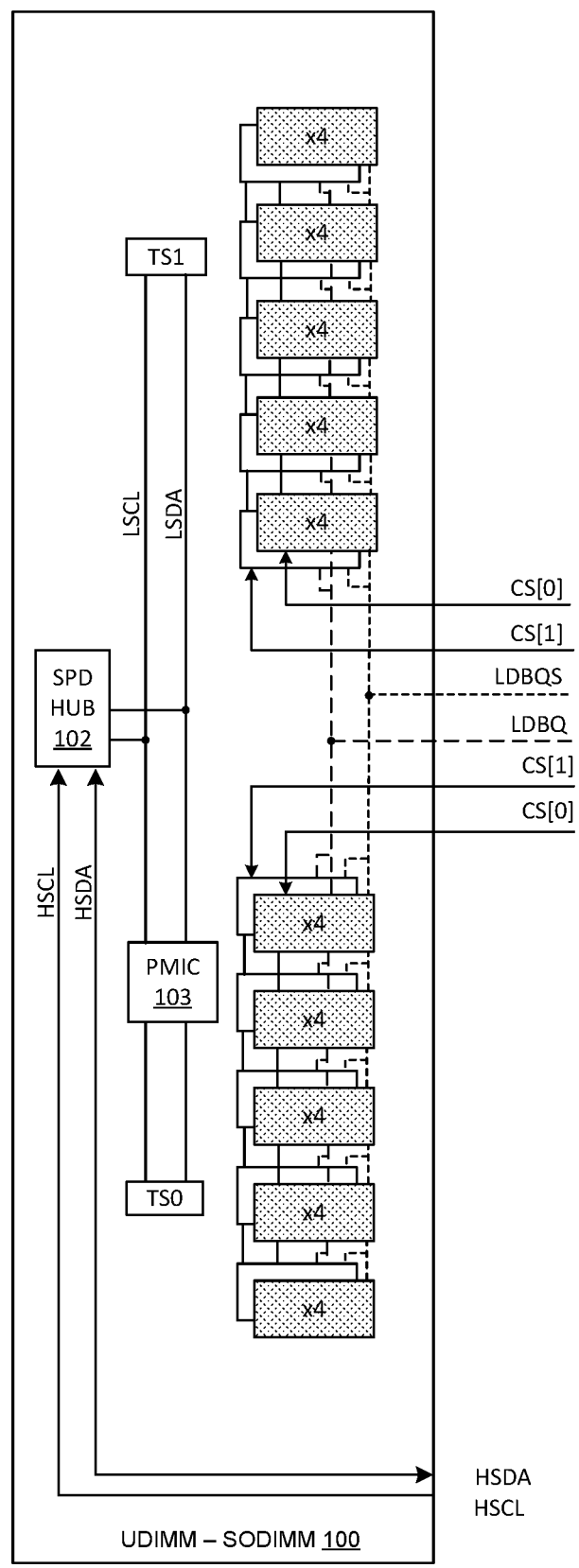
FIG. 10 is a block diagram of an example of an unregistered DIMM (UDIMM) according to an embodiment.

With reference to FIG. 10, an embodiment of an unregistered DIMM (UDIMM) 100 (e.g. or a small-outline DIMM (SODIMM) includes a SPD hub 102, a PMIC 103, and two thermal sensors TS0 and TS1, coupled as shown. The UDIMM 100 utilizes a grid or matrix to segregate front and back DRAM devices (e.g., where the front DRAMs are illustrated as shaded) into nominal rows and columns for enumeration. The DRAM devices include two loopback pins, that embodiments of the UDIMM 100 dual purposes for sideband bus clock and data, without altering the loopback functionality. For example, the DRAM Rank CS signal is utilized to qualify in the row address during addressing enumeration. The matrix row addresses are stored in the SPD hub 102 and are broadcasted on the bus to all DRAM devices. Only the DRAM devices with asserted CS signals will enumerate their row address to the broadcasted value. The column addresses are enumerated by the strap pin current, which are controlled by resistor values to VSS (e.g., as shown in FIG. 3 and FIGS. 6C and 7C). After the address enumeration is completed, the host sideband bus controller has full access to all device configuration registers, and the CS signals are no longer needed to access the individual devices at their respective enumerated addresses.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 11:
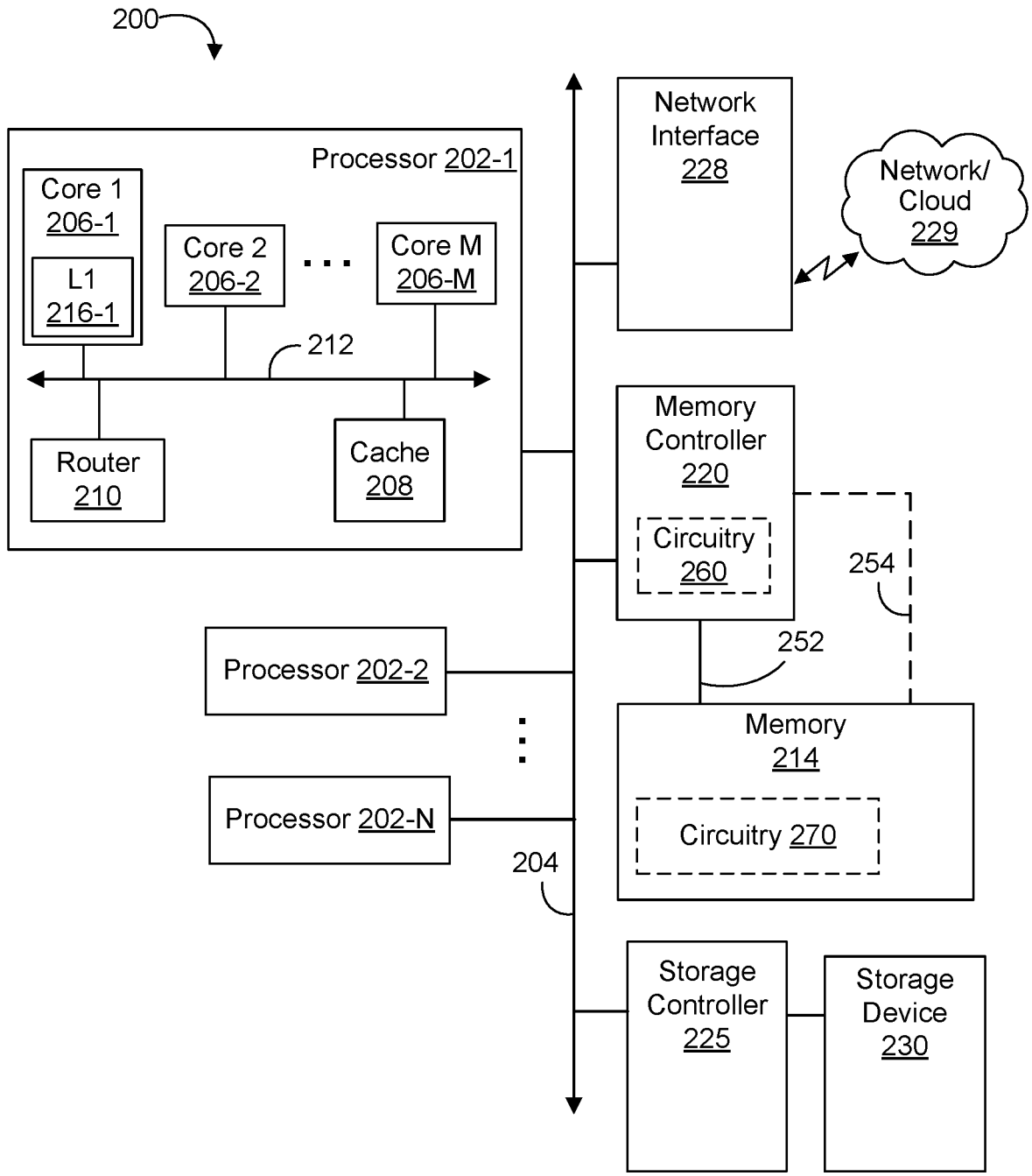
FIG. 11 is a block diagram of another example of a computing system according to an embodiment.

Turning now to FIG. 11, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), circuitry 270, memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 11, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 11, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 11, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, circuitry 270, etc., to sense variations in various factors affecting power/thermal behavior of the system/platform, such as temperature, operating frequency, operating voltage, power consumption, and/or inter-core communication activity, etc.

As shown in FIG. 11, features or aspects of the circuitry 260 and circuitry 270 may be distributed throughout the system 200, and/or co-located/integrated with various components of the system 200. Any aspect of the system 200 that may require or benefit from sideband device management technology may include the circuitry 260 and/or the circuitry 270. For example, the processor(s) 202, the memory 214, the memory controller 220, the storage controller 225, and the network interface 228 may each include circuitry 260, which may be in the same enclosure as the system 200 and/or fully integrated on a printed circuit board (PCB) of the system 200. For example, the circuitry 260 may be configured to implement the enumeration/configuration aspects of the various embodiments, while the circuitry 270 may be configured to implement the device aspects of the various embodiments.

Advantageously, the circuitry 260 and the circuitry 270 may include technology to implement one or more aspects of the system 10 (FIG. 1), the apparatus 20 (FIG. 2), the apparatus 30 (FIG. 3), the method 40 (FIGS. 4A to 4C), the computing system 58 (FIG. 5), the protocol formats (FIGS. 6A to 7C), the LRDIMM 80 (FIG. 8), the RDIMM 90 (FIG. 9), the UDIMM/SODIMM 100 (FIG. 10), and/or any of the sideband device management features discussed herein. The system 200 may include further circuitry 260, 270 located outside of the foregoing components.

In some embodiments, the memory controller 220 may include an in-band bus 252 (e.g., with a DDR interface) and a sideband bus 254 (e.g., with an I3C interface) coupled to the memory 214. The memory 214 may include ten or more memory devices (e.g., a DIMM with multiple DRAM chips and/or DB chips), and the circuitry 260 may be configured to enumerate respective sideband addresses to the ten or more memory devices of the memory 214, and provide bi-directional communication with an individual memory device of the memory 214 with a particular sideband address enumerated to the individual memory device. In some embodiments, the circuitry 260 may be further configured to select a sub-group of the ten or more memory devices for sideband address enumeration, and send an enumeration command to the selected group. For example, the circuitry 260 may be configured to assert respective chip select signals for each memory device of the ten or more memory devices that is in the selected sub-group, and de-assert respective chip select signals for each memory device of the ten or more memory devices that is not in the selected sub-group. In some embodiments, the circuitry 260 may be further configured to program a first portion of sideband addresses in each memory device of the ten or more memory devices that is in the selected sub-group. For example, the circuitry 260 may be configured to broadcast a value of the first portion of the sideband addresses to be programmed in the selected sub-group (e.g., where the value is only processed by the sub-group of memory devices that have the chip select signals asserted).

In some embodiments, the circuitry 270 is configured to program a first portion of a sideband address for an individual memory device of the memory 214 in response to an enumeration command from the memory controller 220, and set a second portion of the sideband address for the individual memory device in accordance with a voltage value on a strap pin of the individual memory device. For example, the circuitry 270 may be configured to inject current into the strap pin in response to the enumeration command from the memory controller 220 to develop the voltage value in accordance with a resistance value on the strap pin, convert the voltage value into a digital value, and set the second portion of the sideband address for the individual memory device based on the digital value.

ADDITIONAL NOTES AND EXAMPLES

Example 1 includes an electronic apparatus, comprising one or more substrates, and a controller coupled to the one or more substrates, the controller including circuitry to enumerate respective sideband addresses to ten or more devices (e.g., memory devices), and provide bi-directional communication with an individual device of the ten or more devices with a particular sideband address enumerated to the individual device.

Example 2 includes the apparatus of Example 1, wherein the circuitry is further to select a sub-group of the ten or more devices for sideband address enumeration, and send an enumeration command to the selected group.

Example 3 includes the apparatus of Example 2, wherein the circuitry is further to assert respective chip select signals for each device of the ten or more devices that is in the selected sub-group, and de-assert respective chip select signals for each device of the ten or more devices that is not in the selected sub-group.

Example 4 includes the apparatus of any of Examples 2 to 3, wherein the circuitry is further to program a first portion of sideband addresses in each device of the ten or more devices that is in the selected sub-group.

Example 5 includes the apparatus of Example 4, wherein the circuitry is further to broadcast a value of the first portion of the sideband addresses to be programmed in the selected sub-group.

Example 6 includes the apparatus of any of Examples 1 to 5, wherein at least one of the ten or more devices comprises an integrated circuit chip with DRAM.

Example 7 includes the apparatus of any of Examples 1 to 6, wherein at least one of the ten or more devices comprises an integrated circuit chip with a DB.

Example 8 includes an electronic system, comprising ten or more memory devices, and a controller communicatively coupled to the ten or more memory devices, the controller including first circuitry to enumerate respective sideband addresses to ten or more memory devices, and provide bi-directional communication with an individual memory device of the ten or more memory devices with a particular sideband address enumerated to the individual memory device.

Example 9 includes the system of Example 8, wherein the first circuitry is further to select a sub-group of the ten or more memory devices for sideband address enumeration, and send an enumeration command to the selected group.

Example 10 includes the system of Example 9, wherein the first circuitry is further to assert respective chip select signals for each memory device of the ten or more memory devices that is in the selected sub-group, and de-assert respective chip select signals for each memory device of the ten or more memory devices that is not in the selected sub-group.

Example 11 includes the system of any of Examples 9 to 10, wherein the first circuitry is further to program a first portion of sideband addresses in each memory device of the ten or more memory devices that is in the selected sub-group.

Example 12 includes the system of Example 11, wherein the first circuitry is further to broadcast a value of the first portion of the sideband addresses to be programmed in the selected sub-group.

Example 13 includes the system of any of Examples 8 to 12, wherein the individual memory device includes second circuitry to program a first portion of a sideband address for the individual memory device in response to an enumeration command from the controller, and set a second portion of the sideband address for the individual memory device in accordance with a voltage value on a strap pin of the individual memory device.

Example 14 includes the system of Example 13, wherein the second circuitry is further to inject current into the strap pin in response to the enumeration command to develop the voltage value in accordance with a resistance value on the strap pin, convert the voltage value into a digital value, and set the second portion of the sideband address for the individual memory device based on the digital value.

Example 15 includes the system of any of Examples 8 to 14, wherein at least one of the ten or more memory devices comprises an integrated circuit chip with DRAM.

Example 16 includes the system of any of Examples 8 to 15, wherein at least one of the ten or more memory devices comprises an integrated circuit chip with a DB.

Example 17 includes a method of controlling memory, comprising enumerating respective sideband addresses to ten or more memory devices, and providing bi-directional communication with an individual memory device of the ten or more memory devices with a particular sideband address enumerated to the individual memory device.

Example 18 includes the method of Example 17, further comprising selecting a sub-group of the ten or more memory devices for sideband address enumeration, and sending an enumeration command to the selected group.

Example 19 includes the method of Example 18, further comprising asserting respective chip select signals for each memory device of the ten or more memory devices that is in the selected sub-group, and de-asserting respective chip select signals for each memory device of the ten or more memory devices that is not in the selected sub-group.

Example 20 includes the method of any of Examples 18 to 19, further comprising programming a first portion of sideband addresses in each memory device of the ten or more memory devices that is in the selected sub-group.

Example 21 includes the method of Example 20, further comprising broadcasting a value of the first portion of the sideband addresses to be programmed in the selected sub-group.

Example 22 includes the method of any of Examples 17 to 21, further comprising programming a first portion of a sideband address by the individual memory device in response to an enumeration command, and setting a second portion of the sideband address by the individual memory device in accordance with a voltage value on a strap pin of the individual memory device.

Example 23 includes the method of Example 22, further comprising injecting current into the strap pin by the individual memory device in response to the enumeration command to develop the voltage value in accordance with a resistance value on the strap pin, converting the voltage value into a digital value by the individual memory device, and setting the second portion of the sideband address by the individual memory device based on the digital value.

Example 24 includes the method of any of Examples 17 to 23, wherein at least one of the ten or more memory devices comprises an integrated circuit chip with DRAM.

Example 25 includes the method of any of Examples 17 to 24, wherein at least one of the ten or more memory devices comprises an integrated circuit chip with a DB.

Example 26 includes at least one non-transitory machine readable medium comprising a plurality of instructions that, in response to being executed on a computing device, cause the computing device to enumerate respective sideband addresses to ten or more memory devices, and provide bi-directional communication with an individual memory device of the ten or more memory devices with a particular sideband address enumerated to the individual memory device.

Example 27 includes the at least one non-transitory machine readable medium of Example 26, comprising a plurality of further instructions that, in response to being executed on the computing device, cause the computing device to select a sub-group of the ten or more memory devices for sideband address enumeration, and send an enumeration command to the selected group.

Example 28 includes the at least one non-transitory machine readable medium of Example 27, comprising a plurality of further instructions that, in response to being executed on the computing device, cause the computing device to assert respective chip select signals for each memory device of the ten or more memory devices that is in the selected sub-group, and de-assert respective chip select signals for each memory device of the ten or more memory devices that is not in the selected sub-group.

Example 29 includes the at least one non-transitory machine readable medium of any of Examples 27 to 28, comprising a plurality of further instructions that, in response to being executed on the computing device, cause the computing device to program a first portion of sideband addresses in each memory device of the ten or more memory devices that is in the selected sub-group.

Example 30 includes the at least one non-transitory machine readable medium of Example 29, comprising a plurality of further instructions that, in response to being executed on the computing device, cause the computing device to broadcast a value of the first portion of the sideband addresses to be programmed in the selected sub-group.

Example 31 includes the at least one non-transitory machine readable medium of any of Examples 26 to 30, comprising a plurality of further instructions that, in response to being executed on the computing device, cause the computing device to program a first portion of a sideband address by the individual memory device in response to an enumeration command, and set a second portion of the sideband address by the individual memory device in accordance with a voltage value on a strap pin of the individual memory device.

Example 32 includes the at least one non-transitory machine readable medium of Example 31, comprising a plurality of further instructions that, in response to being executed on the computing device, cause the computing device to inject current into the strap pin by the individual memory device in response to the enumeration command to develop the voltage value in accordance with a resistance value on the strap pin, convert the voltage value into a digital value by the individual memory device, and set the second portion of the sideband address by the individual memory device based on the digital value.

Example 33 includes the at least one non-transitory machine readable medium of any of Examples 26 to 32, wherein at least one of the ten or more memory devices comprises an integrated circuit chip with DRAM.

Example 34 includes the at least one non-transitory machine readable medium of any of Examples 26 to 33, wherein at least one of the ten or more memory devices comprises an integrated circuit chip with a DB.

Example 35 includes a memory controller apparatus, comprising means for enumerating respective sideband addresses to ten or more memory devices, and means for providing bi-directional communication with an individual memory device of the ten or more memory devices with a particular sideband address enumerated to the individual memory device.

Example 36 includes the apparatus of Example 35, further comprising means for selecting a sub-group of the ten or more memory devices for sideband address enumeration, and means for sending an enumeration command to the selected group.

Example 37 includes the apparatus of Example 36, further comprising means for asserting respective chip select signals for each memory device of the ten or more memory devices that is in the selected sub-group, and means for de-asserting respective chip select signals for each memory device of the ten or more memory devices that is not in the selected sub-group.

Example 38 includes the apparatus of any of Examples 36 to 37, further comprising means for programming a first portion of sideband addresses in each memory device of the ten or more memory devices that is in the selected sub-group.

Example 39 includes the apparatus of Example 38, further comprising means for broadcasting a value of the first portion of the sideband addresses to be programmed in the selected sub-group.

Example 40 includes the apparatus of any of Examples 35 to 39, further comprising means for programming a first portion of a sideband address by the individual memory device in response to an enumeration command, and means for setting a second portion of the sideband address by the individual memory device in accordance with a voltage value on a strap pin of the individual memory device.

Example 41 includes the apparatus of Example 40, further comprising means for injecting current into the strap pin by the individual memory device in response to the enumeration command to develop the voltage value in accordance with a resistance value on the strap pin, means for converting the voltage value into a digital value by the individual memory device, and means for setting the second portion of the sideband address by the individual memory device based on the digital value.

Example 42 includes the apparatus of any of Examples 35 to 41, wherein at least one of the ten or more memory devices comprises an integrated circuit chip with DRAM.

Example 43 includes the apparatus of any of Examples 35 to 42, wherein at least one of the ten or more memory devices comprises an integrated circuit chip with a DB.

Example 44 includes an electronic apparatus, comprising a device (e.g., a memory device), and circuitry coupled to the device, the circuitry to set a sideband address for the device in response to an enumeration command from a controller, and provide bi-directional communication with the controller at the enumerated sideband address.

Example 45 includes the apparatus of Example 44, wherein the circuitry is further to program a first portion of the sideband address for the device in response to the enumeration command from the controller, and set a second portion of the sideband address for the device in accordance with a voltage value on a strap pin of the device.

Example 46 includes the apparatus of Example 45, wherein the circuitry is further to inject current into the strap pin in response to the enumeration command to develop the voltage value in accordance with a resistance value on the strap pin, convert the voltage value into a digital value, and set the second portion of the sideband address for the device based on the digital value.

Example 47 includes the apparatus of any of Examples 44 to 46, wherein the device comprises an integrated circuit chip with DRAM.

Example 48 includes the apparatus of any of Examples 44 to 46, wherein the device comprises an integrated circuit chip with a DB.

Example 49 includes a method, comprising setting a sideband address for a device (e.g., a memory device) in response to an enumeration command from a controller, and providing bi-directional communication with the controller at the enumerated sideband address.

Example 50 includes the method of Example 49, further comprising programming a first portion of the sideband address for the device in response to the enumeration command from the controller, and setting a second portion of the sideband address for the device in accordance with a voltage value on a strap pin of the device.

Example 51 includes the method of Example 50, further comprising injecting current into the strap pin in response to the enumeration command to develop the voltage value in accordance with a resistance value on the strap pin, converting the voltage value into a digital value, and setting the second portion of the sideband address for the device based on the digital value.

Example 52 includes the method of any of Examples 49 to 51, wherein the device comprises an integrated circuit chip with DRAM.

Example 53 includes the method of any of Examples 49 to 51, wherein the device comprises an integrated circuit chip with a DB.

Example 54 includes at least one non-transitory machine readable medium comprising a plurality of instructions that, in response to being executed on a computing device, cause the computing device to set a sideband address for a device in response to an enumeration command from a controller, and provide bi-directional communication with the controller at the enumerated sideband address.

Example 55 includes the at least one non-transitory machine readable medium of Example 54, comprising a plurality of further instructions that, in response to being executed on the computing device, cause the computing device to program a first portion of the sideband address for the device in response to the enumeration command from the controller, and set a second portion of the sideband address for the device in accordance with a voltage value on a strap pin of the device.

Example 56 includes the at least one non-transitory machine readable medium of Example 55, comprising a plurality of further instructions that, in response to being executed on the computing device, cause the computing device to injecting current into the strap pin in response to the enumeration command to develop the voltage value in accordance with a resistance value on the strap pin, converting the voltage value into a digital value, and setting the second portion of the sideband address for the device based on the digital value.

Example 57 includes the at least one non-transitory machine readable medium of any of Examples 54 to 56, wherein the device comprises an integrated circuit chip with DRAM.

Example 58 includes the at least one non-transitory machine readable medium of any of Examples 54 to 56, wherein the device comprises an integrated circuit chip with a DB.

Example 59 includes an apparatus, comprising means for setting a sideband address for a device in response to an enumeration command from a controller, and means for providing bi-directional communication with the controller at the enumerated sideband address.

Example 60 includes the apparatus of Example 59, further comprising means for programming a first portion of the sideband address for the device in response to the enumeration command from the controller, and means for setting a second portion of the sideband address for the device in accordance with a voltage value on a strap pin of the device.

Example 61 includes the apparatus of Example 60, further comprising means for injecting current into the strap pin in response to the enumeration command to develop the voltage value in accordance with a resistance value on the strap pin, means for converting the voltage value into a digital value, and means for setting the second portion of the sideband address for the device based on the digital value.

Example 62 includes the apparatus of any of Examples 59 to 61, wherein the device comprises an integrated circuit chip with DRAM.

Example 63 includes the apparatus of any of Examples 59 to 61, wherein the device comprises an integrated circuit chip with a DB.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
a controller coupled to the one or more substrates, the controller including circuitry to:
enumerate a plurality of sideband addresses which are each to correspond to a different respective one of a plurality of memory devices, the plurality of sideband addresses each comprising a respective first portion and a respective second portion, wherein the circuitry to enumerate the plurality of sideband addresses comprises the circuitry to:
send an enumeration command to each of the plurality of memory devices;
assert first chip select signals which each correspond to a respective one of the plurality of memory devices; and
broadcast a value to each of the plurality of memory devices;
wherein, for each memory device of the plurality of memory devices:
a respective one of the first chip select signals is to enable the memory device to program the first portion of the corresponding sideband address based on the value and the enumeration command; and
the enumeration command is to cause the memory device to:
inject a respective current into a strap pin of the memory device;
convert a voltage value into a respective multi-bit digital value, wherein the voltage value is based on the respective current and a resistance value on the strap pin; and
set the second portion of the corresponding sideband address based on the respective multi-bit digital value; and
provide bi-directional communication with one of the plurality of memory devices based on the corresponding sideband address.

2. The apparatus of claim 1, wherein the circuitry is further to:
select a sub-group of ten or more memory devices for sideband address enumeration, the sub-group comprising the plurality of memory devices, wherein the circuitry is to assert the first chip select signals while de-asserting one or more second chip select signals which each correspond to a respective one or more other of the ten or more memory devices.

3. The apparatus of claim 1, wherein, for each sideband address of the plurality of sideband addresses, the respective first portion of the sideband address is to comprise four bits of a corresponding row identifier.

4. The apparatus of claim 3, wherein, for each sideband address of the plurality of sideband addresses, the respective second portion of the sideband address is to comprise three bits of one of a corresponding column identifier or a corresponding host identifier.

5. The apparatus of claim 1, wherein at least one of the plurality of memory devices comprises an integrated circuit chip with dynamic random access memory.

6. The apparatus of claim 1, wherein at least one of the plurality of memory devices comprises an integrated circuit chip with a data buffer.

7. An electronic system, comprising:
a plurality of memory devices each comprising a respective strap pin; and
a controller communicatively coupled to the plurality of memory devices, the controller including first circuitry to:
  enumerate a plurality of sideband addresses which are each to correspond to a different respective one of the plurality of memory devices, the plurality of sideband addresses each comprising a respective first portion and a respective second portion, wherein the circuitry to enumerate the plurality of sideband addresses comprises the circuitry to:
    send an enumeration command to each of the plurality of memory devices;
    assert first chip select signals which each correspond to a respective one of the plurality of memory devices; and
    broadcast a value to each of the plurality of memory devices;
  wherein, for each memory device of the plurality of memory devices:
    a respective one of the first chip select signals is to enable the memory device to program the first portion of the corresponding sideband address based on the value and the enumeration command; and
    the enumeration command is to cause the memory device to:
      inject a respective current into the strap pin of the memory device;
      convert a voltage value into a respective multi-bit digital value, wherein the voltage value is based on the respective current and a resistance value on the strap pin; and
      set the second portion of the corresponding sideband address based on the respective multi-bit digital value; and
  provide bi-directional communication with one of the plurality of memory devices based on the corresponding sideband address.

8. The system of claim 7, wherein the first circuitry is further to:
select a sub-group of ten or more memory devices for sideband address enumeration, the sub-group comprising the plurality of memory devices, wherein the circuitry is to assert the first chip select signals while de-asserting one or more second chip select signals which each correspond to a respective one or more other of the ten or more memory devices.

9. The system of claim 7, wherein, for each sideband address of the plurality of sideband addresses, the respective first portion of the sideband address is to comprise four bits of a corresponding row identifier.

10. The system of claim 9, wherein, for each sideband address of the plurality of sideband addresses, the respective second portion of the sideband address is to comprise three bits of one of a corresponding column identifier or a corresponding host identifier.

11. The system of claim 7, wherein at least one of the plurality of memory devices comprises an integrated circuit chip with one of dynamic random access memory or a data buffer.

12. A method of controlling memory, comprising:
enumerating a plurality of sideband addresses which are each to correspond to a different respective one of a plurality of memory devices, the plurality of sideband addresses each comprising a respective first portion and a respective second portion, wherein enumerating the plurality of sideband addresses comprises:
  sending an enumeration command to each of the plurality of memory devices;
  asserting first chip select signals which each correspond to a respective one of the plurality of memory devices; and
  broadcasting a value to each of the plurality of memory devices;
wherein, for each memory device of the plurality of memory devices:
  a respective one of the first chip select signals enables the memory device to program the first portion of the corresponding sideband address based on the value and the enumeration command; and
  the enumeration command causes the memory device to:
    inject a respective current into a strap pin of the memory device;
    convert a voltage value into a respective multi-bit digital value, wherein the voltage value is based on the respective current and a resistance value on the strap pin; and
    set the second portion of the corresponding sideband address based on the respective multi-bit digital value; and
providing bi-directional communication with one of the plurality of memory devices based on the corresponding sideband address.

13. The method of claim 12, further comprising:
selecting a sub-group of ten or more memory devices for sideband address enumeration, the sub-group comprising the plurality of memory devices, wherein the first chip select signals are asserted while de-asserting one or more second chip select signals which each correspond to a respective one or more other of the ten or more memory devices.

14. The method of claim 12, wherein, for each sideband address of the plurality of sideband addresses, the respective first portion of the sideband address is to comprise four bits of a corresponding row identifier.

15. The method of claim 14, wherein, for each sideband address of the plurality of sideband addresses, the respective second portion of the sideband address is to comprise three bits of one of a corresponding column identifier or a corresponding host identifier.

* * * * *